United States Patent [15] 3,694,441
Dunwell et al. [45] Sept. 26, 1972

[54] PYRIMIDOTRIAZINONE COMPOUNDS

[72] Inventors: David William Dunwell, 27 Alexandra Ave., Camberley, Surrey; Delme Evans, 7 Springwoods, Sandhurst, Berkshire, both of England

[22] Filed: March 5, 1971
[21] Appl. No.: 121,597

[52] U.S. Cl................................260/249.5, 424/249
[51] Int. Cl. ..............................................C07d 57/12
[58] Field of Search...................................260/249.5

[56] References Cited
UNITED STATES PATENTS
3,213,090 10/1965 Roch..................260/249.5 X

*Primary Examiner*—John M. Ford
*Attorney*—Everet F. Smith and Walter E. Buting

[57] ABSTRACT

Substituted 1H,4H-pyrimido[2,1-c]-[1,2,4]triazin-6-ones are prepared by reacting an appropriately substituted thiazolo- or oxazolo-[3,2-a]pyrimidin-5-one with a hydrazino compound. The resultant pyrimidotriazinones possess anti-fungal and anthelmintic activity.

10 Claims, No Drawings

PYRIMIDOTRIAZINONE COMPOUNDS

The novel compounds of the present invention have the formula:

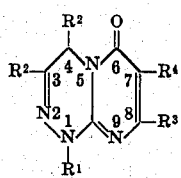

I wherein $R^1$ represents hydrogen, $C_{1-5}$ alkyl or —$CH_2Ar$ in which Ar represents phenyl optionally substituted by halogen, nitro, $C_{1-5}$ alkyl or $C_{1-5}$ alkoxy; $R^2$ represents hydrogen, $C_{1-5}$ alkyl or the group Ar as defined above, the two $R^2$ groups being the same or different; $R^3$ is hydrogen or $C_{1-5}$ alkyl; and $R^4$ represents hydrogen or —$COR^5$ in which $R^5$ is $C_{1-5}$ alkoxy, $C_{1-5}$ alkylamino, or —$NHN(R^1)_2$ where $R^1$ is as defined above and the two $R^1$ groups may be the same or different.

By the term "$C_{1-5}$ alkyl" as used herein, we mean saturated aliphatic hydrocarbon groups having from one to five carbon atoms, exemplary of which are methyl, ethyl, n.propyl, isopropyl, n.butyl, s.butyl, t.butyl, n.amyl and s.amyl. The term "$C_{1-5}$ alkoxy" means the aforementioned $C_{1-5}$ alkyl groups linked through an oxygen atom such as methoxy, ethoxy, isopropoxy, n.butoxy, s.butoxy and m.amyloxy. The term "$C_{1-5}$ alkylamino" means an amino group, one or two of the hydrogen atoms of which are replaced by $C_{1-5}$ alkyl, such as methylamino, dimethylamino, ethylamino, di-n.propylamino, isopropylamino, t.butylamino and n.a-mylamino.

A preferred group of compounds falling within the scope of compounds of formula I are those where $R^1$ represents hydrogen, $C_{1-5}$ alkyl, benzyl, halobenzyl or nitrobenzyl; one of $R^2$ is hydrogen and the other $R^2$ is hydrogen, methyl, ethyl, phenyl, halophenyl or nitrophenyl; $R^3$ is hydrogen, methyl or ethyl; and $R^4$ is hydrogen, methoxycarbonyl, ethoxycarbonyl propoxycarbonyl, butoxycarbonyl, methylaminocarbonyl, dimethylaminocarbonyl, ethylaminocarbonyl, diethylaminocarbonyl, hydrazinocarbonyl, methylhydrazinocarbonyl, dimethylhydrazinocarbonyl, ethylhydrazinocarbonyl, diethylhydrazinocarbonyl or benzylhydrazinocarbonyl.

The compounds of formula I may be prepared by a method which comprises reacting an appropriately substituted thiazolo- or oxazolo-[3,2-a]-pyrimidin-5-one of formula:

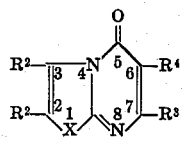

II with a hydrazino compound of the formula:

$H_2N.NHR^1$   III wherein $R^1$, $R^2$, $R^3$ and $R^4$ are as defined above and X is oxygen or sulphur, the reaction being carried out in a suitable reaction solvent, for example ethanol, and normally at reflux for periods of from 0.5 up to 125 hours depending on the reactants being used. Normally the oxazolo compounds of formula II react more rapidly than the corresponding thiazolo compounds. To avoid obtaining a mixture of products of formula I, the compound of formula III is preferably hydrazine itself or hydrazine hydrate and the resultant compound of formula I in which $R^1$ is hydrogen is subsequently alkylated or benzylated in conventional manner, for example using silver oxide and an appropriate alkyl or benzyl halide, to produce the desired compound in which $R^1$ is $C_{1-5}$ alkyl or —$CH_2Ar$.

When $R^4$ in formula II is an alkoxycarbonyl group and an excess of hydrazine is used in the reaction, the resultant product of formula I is a carboxylic acid hydrazide, i.e., the alkoxycarbonyl group of the starting material is replaced by a hydrazinocarbonyl group simultaneously with the ring expansion. A carboxylic acid hydrazide can also, of course, be prepared by refluxing a resultant compound of formula I in which $R^4$ is alkoxycarbonyl with a further quantity of the compound of formula III. Similarly a compound of formula I in which $R^4$ is alkoxycarbonyl can readily be converted to the corresponding compound in which $R^4$ is alkylaminocarbonyl by reaction with the appropriate alkylamine.

Specific compounds which can be prepared by the process of the present invention include:
3-methyl-1H,4H-pyrimido[2,1-c]-[1,2,4]triazin-6-one
8-methyl-1H,4H-pyrimido[2,1-c]-[1,2,4]triazin-6-one
3,4-diethyl-1H,4H-pyrimido[2,1-c]-[1,2,4]triazin-6-one
4,8-dimethyl-1H,4H-pyrimido[2,1-c]-[1,2,4]triazin-6-one
1,3-dimethyl-1H,4H-pyrimido[2,1-c]-[1,2,4]triazin-6-one
1-s.butyl-7-ethoxycarbonyl-1H,4H-pyrimido[2,1-c]-[1,2,4]triazin-6-one
1-methyl-7-ethoxycarbonyl-1H,4H-pyrimido[2,1-c]-[1,2,4]triazin-6-one
1-methyl-7-t.butoxycarbonyl-1H,4H-pyrimido[2,1-c]-[1,2,4]triazin-6-one
3-methyl-7-ethoxycarbonyl-1H,4H-pyrimido[2,1-c]-[1,2,4]triazin-6-one
1,3-dimethyl-7-ethoxycarbonyl-1H,4H-pyrimido[2,1-c]-[1,2,4]triazin-6-one
1-benzyl-7-ethoxycarbonyl-1H,4H-pyrimido[2,1-c]-[1,2,4]triazin-6-one
1-p.nitrobenzyl-7-ethoxycarbonyl-1H,4H-pyrimido[2,1-c]-[1,2,4]triazin-6-one
1-o-chlorobenzyl-7-t.butoxycarbonyl-1H,4H-pyrimido[2,1-c]-[1,2,4]triazin-6-one
1-p.methylbenzyl-1H,4H-pyrimido[2,1-c]-[1,2,4]triazin-6-one
1-p.methoxybenzyl-1H,4H-pyrimido[2,1-c]-[1,2,4]triazin-6-one
3-phenyl-7-ethoxycarbonyl-1H,4H-pyrimido[2,1-c]-[1,2,4]triazin-6-one
3-p.nitrophenyl-7-ethoxycarbonyl-1H,4H-pyrimido[2,1-c]-[1,2,4]triazin-6-one
3-phenyl-7-ethoxycarbonyl-8-methyl-1H,4H-pyrimido[2,1-c]-[1,2,4]triazin-6-one
7-ethoxycarbonyl-1H,4H-pyrimido[2,1-c]-[1,2,4]triazin-6-one
N',N'-dimethyl-1H,4H-pyrimido[2,1-c]-[1,2,4]triazin-6-one, 7-carboxamide N'-propyl-1H,4H-pyrimido[2,1-c]-[1,2,4]triazin-6-one, 7-carboxamide
1,N'-dimethyl-1H,4H-pyrimido[2,1-c]-[1,2,4]triazin-6-one, 7 carboxamide
N'-methyl-3-o.tolyl-1H,4H-pyrimido[2,1-c]-[1,2,4]triazin-6-one, 7 carboxamide
N'-ethyl-1-benzyl-4,8-dimethyl-1H,4H-pyrimido[2,1-c]-[1,2,4]triazin-6-one, 7-carboxamide 1H,4H-pyrimido[2,1-c]-[1,2,4]triazin-6-one, 7-carboxylic acid hydrazide
1,3,N'-trimethyl-1H,4H-pyrimido[2,1-c]-[1,2,4]triazin-6-one, 7-carboxylic acid hydrazide
1-s.butyl-1H,4H-pyrimido[2,1-c]-[1,2,4]triazin-6-one, 7-carboxylic acid hydrazide
3-methyl-1H,4H-pyrimido[2,1-c]-[1,2,4]triazin-6-one, 7-carboxylic acid hydrazide
1-p.nitrobenzyl-1H,4H-pyrimido[2,1-c]-[1,2,4]triazin-6-one, 7-carboxylic acid hydrazide
4,8-diphenyl-1H,4H-pyrimido[2,1-c]-[1,2,4]triazin-6-one, 7-carboxylic acid hydrazide
1-isopropyl-1H,4H-pyrimido[2,1-c]-[1,2,4]triazin-6-one, 7-carboxylic acid hydrazide
1,N'-dibenzyl-1H,4H-pyrimido[2,1-c]-[1,2,4]triazin-6-one, 7-carboxylic acid hydrazide
N'-methyl-3-phenyl-1H,4H-pyrimido[2,1-c]-[1,2,4]triazin-6-one, 7-carboxylic acid hydrazide
1-n.amyl-1H,4H-pyrimido[2,1-c]-[1,2,4]triazin-6-one, 7-carboxylic acid hydrazide
N'-t.butyl-1H,4H-pyrimido[2,1-c]-[1,2,4]triazin-6-one, 7-carboxylic acid hydrazide
1-p.chlorobenzyl-1H,4H-pyrimido[2,1-c]-[1,2,4]triazin-6-one, 7-carboxylic acid hydrazide The intermediate compounds of formula II used in the process of the present invention are either known or are prepared by known methods, for example as described in the Journal of Organic Chemistry, 1959, 24, 779. The following Examples illustrate the general process used for preparing oxazolo- and thiazolo- intermediates of formula II.

EXAMPLE A

A solution of 2-aminooxazole (10.8 g.) was heated under reflux for 2 hours with diethyl ethoxymethylene malonate (27.5 g.) in 1,2,4-trichlorobenzene (100 ml.). The ethanol which formed in the reaction was collected, the remaining solution allowed to cool and the solid which formed was filtered off, washed in ether and dissolved in isopropanol. After treatment with carbon, the solution was allowed to cool and the crystals formed were filtered off to give 6-ethoxycarbonyl-5-oxazolo[3,2-a]pyrimidinone, m.p. 130°–133° C. (dec.).

EXAMPLE B

Using the method of Example A but with 2-amino-5-phenylthiazole and diethyl ethoxymethylene malonate, 6-ethoxycarbonyl-2-phenyl-5-thiazolo-[3,2-a]pyrimidinone was obtained, m.p. 189° C. from chloroform/carbon tetrachloride.

As stated previously, the compounds of formula I possess anthelmintic activity and are especially effective against *Nematospiroides dubius* and *Syphacia obvelata*. Dosage levels vary depending upon the compound being used, the animal to be treated, and the helminth to be controlled but, in general, the compounds of the present invention are administered in a single dose of from 50 to 300 mg./Kg. of animal body weight.

The compounds of the invention may be administered in a variety of ways but normally as a single oral or parenteral dose at a time when helminthiasis is apparent or suspected. The dose administered may, of course, contain other anthelmintics, parasiticides or antibacterials.

In general, compositions containing the active anthelmintic compound are used; the amounts of the anthelmintic ingredient in the composition, as well as the remaining constituents, will vary according to the type of treatment, the host animal, and the particular parasitic disease. In general, however, compositions containing a total weight percent of the active compound or compounds ranging from 0.001 to 95% will be suitable with the remainder being any suitable carrier or vehicle.

A number of modes of treatment may be used, and each to some extent determines the general nature of the compositions. For example, the anthelmintic compounds may be administered to domesticated animals in a single unit oral dosage form such as a tablet, bolus, capsule or drench, or in the liquid oil base form suitable for parenteral administration; or they may be compounded as a feed premix to be later admixed with the animal's food.

When the compositions are to be solid unit dosage forms, such as in tablets, capsules, or boluses, the ingredients other than the active compounds may be any other pharmaceutically acceptable vehicles convenient in the preparation of such forms, and preferably materials nutritionally suitable, such as starch, lactose, talc, magnesium stearate and vegetable gums. In capsules, the active compound may be used in essentially undiluted form, the only extraneous material being that of the capsule casing itself, which may be hard or soft gelatin or any other pharmaceutically acceptable encapsulating material. When the dosage form is a liquid oil base form, the active compound is suitably admixed with an acceptable oil base vehicle, preferably of the vegetable oil variety, such as peanut oil or cotton-seed oil. In all of such forms, i.e., in tablets, boluses, capsules, and oil base formulations, the active compound conveniently ranges from about 5 to 80% by weight of the total composition.

When the unit dosage form is to be in the form of a drench, the anthelmintic agents may be mixed with agents which will aid in the subsequent suspending of the active compound in water, such as bentonite, clays, water-soluble starches, cellulose derivatives, gums and surface active agents, to form a dry pre-drench composition, which is added to water just before use. In the pre-drench formulation, in addition to the suspending agent, such ingredients as preservatives and anti-foam compounds may be included. Such a dry product may contain as much as 95% by weight of the active compound, the rest being contributed by the excipients. Preferably, the solid composition contains from 30 to 95% by weight of the active compound. Enough water should be added to the solid product to provide the proper dosage level within a convenient amount of liquid for a single oral dose. Liquid drench formulations containing from about 10 to 30 weight percent of dry ingredients will in general be suitable, with the preferred range being from 15 to 20 weight percent.

Where the compositions are intended to be used as feeds, feed supplements or feed pre-mixes, they will be mixed with suitable ingredients of an animal's nutrient ration. The solid orally ingestible carriers normally used for such purposes, such as distillers' dried grains, corn meal, fermentation residues, ground oyster shells, corn cob meal, edible vegetable substances, soybean mill feed and soya grits are all suitable. The active compounds are intimately dispersed or admixed throughout the solid inert carrier by methods such as grinding, stirring, milling or tumbling. By selecting proper diluents and by altering the ratio of carrier to active ingredient, compositions of any desired concentration may be prepared. Feed supplement formulations containing from about 10 to 30% by weight of active ingredient are particularly suitable for addition to feeds. The active compound is normally dispersed or mixed uniformly in the diluent but in some instances may be adsorbed on the carrier. These supplements are added to the finished animal feed in an amount adequate to give the final concentration desired for controlling or treating the helminth infection by way of the animal ration. Although the preferred level in feeds will depend on the particular compound, 0.05 to 25% by weight of the active compounds of this invention is normally included in the feed.

In addition to their use as anthelmintics, the compounds of formula I are useful as fungicides, being particularly useful for the control of plant pathogens, especially Botrytis cinerea which is the causative organism of grey mould in grapes.

Accordingly the present invention also provides a method of controlling fungi which attack plants which comprises applying to the locus of the fungus a fungicidal amount of at least one compound of formula I above. In carrying out the method of the present invention, the compound may be applied to the foliage of crops and plants, and/or to the soil or water in which the crops or plants are growing.

The fungicidal compounds of the present invention will normally be used in the form of compositions comprising the active ingredient in association with a suitable diluent or carrier material such as one or more of water, alcohols, glycols, glycol ethers, petroleum distillates and various dispersion media such as surfactants, emulsifiers and finely divided inert solids. The concentration of the active ingredient in these compositions will vary depending on whether the composition is to be used directly as a dust or is intended as an emulsifiable concentrate or wettable powder designed to be subsequently diluted for example with water prior to use.

Since in use the compounds will normally be applied to infected or susceptible plants in compositions containing from about 200 to 4,000 p.p.m., preferably from about 400 to 2,000 p.p.m., of the active ingredient, it is normally convenient for ease of formulation, storage, package, etc., to formulate the active ingredient as a liquid or solid concentrate composition.

Liquid concentrates may be prepared by dissolving, dispersing or suspending from 0.1 to 10% of the active ingredient in water or a suitable water-miscible solvent such as, for example, suitable aromatic, aliphatic or cyclo-aliphatic hydrocarbons, ketones or alcohols to which may be added an emulsifying agent, for example a nonionic or ionic type or blend such as condensation products of alkylene oxides with phenols and organic acids, polyoxyethylene derivatives of sorbitan esters, complex ether-alcohols and the like.

Solid concentrate mixtures may be prepared by incorporating from 5 to 30% of the active ingredient in a finely divided solid carrier such as bentonite, fuller's earth, diatomaceous earth, hydrated silica, diatomaceous silica, kaolin, expanded mica, attapulgite, talc, chalk and the like. Such concentrates may be formulated for direct use or may, if desired, be diluted with additional inert solid carriers to produce dusting powders. Alternatively dispersing and/or wetting agents may be incorporated to form wettable powder concentrates which subsequently may be dispersed in water or in other aqueous carriers to form spray compositions. Suitable wetting and emulsifying agents include sodium lauryl sulphate, sodium lignosulphate and other suitable nonionic and anionic surfactants or blends thereof.

The following Examples will further illustrate the preparation of the novel compounds of this invention:

EXAMPLE 1 a. A solution of 6-ethoxycarbonyl-5-thiazolo-[3,2-a]pyrimidinone (4.5 g.) and hydrazine hydrate (2 ml.) in ethanol (100 ml.) was heated under reflux for 5 hours. White crystals formed which were filtered off and recrystallized from ethanol/dimethylformamide to give 7-ethoxycarbonyl-1H,4H-pyrimido[2,1-c]-[1,2,4]triazin-6-one, m.p. 275° C.

b. By the method of (a) above but using 6-ethoxycarbonyl-5-oxazolo-[3,2-a]pyrimidinone, 2 equivalents of hydrazine and a reaction time of 0.5 hours, 7-ethoxycarbonyl-1H,4H-pyrimido[2,1-c]-[1,2,4]triazin-6-one, m.p. 275° C., was obtained.

EXAMPLE 2 a. A solution of 6-ethoxycarbonyl-5-oxazolo[3,2-a]pyrimidinone (1 g.) and hydrazine hydrate (2.5 ml.) in ethanol (75 ml.) was heated under reflux for 18 hours. A solid formed which was filtered off and recrystallized from dimethylformamide to give 1H,4H-pyrimido[2,1-c]-[1,2,4]triazin-6-one, 7-carboxylic acid hydrazide, m.p. > 330° C.

b. By the method of (a) above but using 6-ethoxycarbonyl-5-thiazolo[3,2-a]-pyrimidinone, 6 equivalents of hydrazine and a reaction time of 20 hours, 1H,4H-pyrimido[2,1-c]-[1,2,4]triazin-6-one, 7-carboxylic acid hydrazide, m.p. > 330° C., was obtained.

EXAMPLE 3

By the method of Example 1(a) above but using 2-methyl-6-ethoxycarbonyl-5-thiazolo[3,2-a]pyrimidinone (5 g.), 95% hydrazine (1.5 ml.) and a reaction time of 4.5 hours, 3-methyl-7-ethoxycarbonyl-1H,4H-pyrimido[2,1-c]-[1,2,4]-triazin-6-one was prepared, m.p. 249° – 250° C., after recrystallization from ethanol/dimethylformamide.

EXAMPLE 4

By the method of Example 1(a) but using 2-phenyl-6-ethoxycarbonyl-5-thiazolo[3,2-a]pyrimidinone, 2 equivalents of hydrazine and a reaction time of 10 hours, 3-phenyl-7-ethoxycarbonyl-1H,4H-pyrimido[2,1-c]-[1,2,4]triazin-6-one was prepared, m.p. 285° C., after recrystallization from dimethylformamide.

EXAMPLE 5

By the method of Example 1(a) but using 7-methyl-5-thiazolo[3,2-a]-pyrimidinone, 25 equivalents of hydrazine and a reaction time of 18 hours, 8-methyl-1H,4H-pyrimido[2,1-c]-[1,2,4]triazin-6-one was prepared, m.p. 290° C., after recrystallization from chloroform/dimethylsulphoxide.

EXAMPLE 6

By the method of Example 1(a) but using 3,7-dimethyl-5-thiazolo[3,2-a]-pyrimidinone, 5 equivalents of hydrazine and a reaction time of 125 hours, 4,8-dimethyl-1H,4H-pyrimido[2,1-c]-[1,2,4]triazin-6-one was obtained, m.p. 220° C., after recrystallization from chloroform/petroleum ether.

EXAMPLE 7

A suspension of 7-ethoxycarbonyl-1H,4H-pyrimido[2,1-c]-[1,2,4]triazin-6-one (600 mg.) and silver oxide (500 g.) in a solution of methyl iodide (1 ml.) in dimethylformamide (10 ml.) was stirred at room temperature for 7 hours. The mixture was evaporated to dryness and the solid extracted with chloroform. The chloroform extracts were evaporated to dryness and the residue recrystallized from ethanol to give 1-methyl-7-ethoxycarbonyl-1H,4H-pyrimido[2,1-c]-[1,2,4]triazin-6-one, m.p. 173° C.

EXAMPLE 8

By the method of Example 7 but using the appropriate alkylated or benzylating agent, there were prepared:
1-s.butyl-7-ethoxycarbonyl-1H,4H-pyrimido[2,1-c]-[1,2,4]triazin-6-one, m.p. 77° C., after recrystallization from petroleum ether;
1-benzyl-7-ethoxycarbonyl-1H,4H-pyrimido[2,1-c]-[1,2,4]triazin-6-one, m.p. 148° C., after recrystallization from isopropanol; and
1-p.nitrobenzyl-7-ethoxycarbonyl-1H,4H-pyrimido[2,1-c]-[1,2,4]triazin-6-one, m.p. 162° C., after recrystallization from dimethylformamide/ethanol.

EXAMPLE 9

By the method of Example 7 but using 3-methyl-7-ethoxycarbonyl-1H,4H-pyrimido[2,1-c]-[1,2,4]triazin-6-one, there was prepared 1,3-dimethyl-7-ethoxycarbonyl-1H,4H-pyrimido[2,1-c]-[1,2,4]triazin-6-one, m.p. 158° C., after recrystallization from chloroform/carbon tetrachloride.

EXAMPLE 10 a. A solution of 2-methyl-6-ethoxycarbonyl-5-thiazolo[3,2-a]pyrimidinone (5 g.) and methyl hydrazine (20 ml.) in ethanol (70 ml.) was heated under reflux conditions for 15 hours. The solution was allowed to cool slightly and the solid which formed was filtered off, recrystallized twice from ethanol and once from water to give 1,3,N'-trimethyl-1H,4H-pyrimido[2,1-c]-[1,2,4]-triazin-6-one, 7-carboxylic acid hydrazide, m.p. 196° C.

b. A solution of 1,3-dimethyl-7-ethoxycarbonyl-1H,4H-pyrimido[2,1-c]-[1,2,4]triazin-6-one (3.2 g.) and methylhydrazine (16 ml.) in ethanol (45 ml.) was refluxed for 14 hours. The solution was allowed to cool and the resultant crystals filtered off. After recrystallization 3 times from ethanol and twice from water, there was obtained, 1,3N'-trimethyl-1H,4H-pyrimido[2,1-c]-[1,2,4]triazin-6-one, 7-carboxylic acid hydrazide, m.p. 126° C.

Microanalytical results obtained for each of the compounds of Examples 1 to 10 agreed with the theoretical values to within ±0.3%

We claim:

1. Compound of the formula:

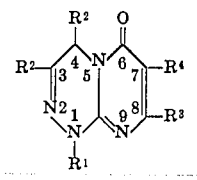

I wherein $R^1$ represents hydrogen, $C_{1-5}$ alkyl or $-CH_2Ar$ in which Ar represents phenyl optionally substituted by halogen, nitro, $C_{1-5}$ alkyl or $C_{1-5}$ alkoxy; $R^2$ represents hydrogen, $C_{1-5}$ alkyl or the group Ar as defined above, the two $R^2$ groups being the same or different; $R^3$ is hydrogen or $C_{1-5}$ alkyl; and $R^4$ represents hydrogen or $-COR^5$ in which $R^5$ is $C_{1-5}$ alkoxy, $C_{1-5}$ alkylamino, or $-NHN(R^1)_2$ where $R^1$ is as defined above and the two $R^1$ groups may be the same or different.

2. Compound as claimed in claim 1, wherein $R^1$ represents hydrogen, $C_{1-5}$ alkyl, benzyl, halobenzyl or nitrobenzyl; one of $R^2$ is hydrogen and the other $R^2$ is hydrogen, methyl, ethyl, phenyl, halophenyl or nitrophenyl; $R^3$ is hydrogen, methyl or ethyl; and $R^4$ is hydrogen, methoxycarbonyl, ethoxycarbonyl, propoxycarbonyl, butoxycarbonyl, methylaminocarbonyl, dimethylaminocarbonyl, ethylaminocarbonyl, diethylaminocarbonyl, hydrazinocarbonyl, methylhydrazinocarbonyl, dimethylhydrazinocarbonyl, ethylhydrazinocarbonyl, diethylhydrazinocarbonyl or benzylhydrazinocarbonyl.

3. Compound as claimed in claim 1, wherein $R^2$ and $R^3$ are hydrogen, $R^4$ is ethoxycarbonyl and $R^1$ is selected from $C_{1-5}$ alkyl, benzyl or nitrobenzyl.

4. Compound as claimed in claim 1, wherein $R^2$ and $R^3$ are hydrogen, $R^4$ is hydrazinocarbonyl or methylhydrazinocarbonyl, and $R^1$ is selected from hydrogen, $C_{1-5}$ alkyl, benzyl or nitrobenzyl.

5. Compound as claimed in claim 3, wherein $R^1$ is selected from methyl, s.butyl, benzyl or p.nitrobenzyl.

6. Compound as claimed in claim 1, wherein $R^1$ and $R^4$ are hydrogen, $R^3$ is methyl and $R^2$ is hydrogen or 4-methyl.

7. Compound as claimed in claim 1, wherein $R^1$ and $R^3$ are hydrogen, $R^4$ is ethoxycarbonyl and $R^2$ is 3-methyl or 3-phenyl.

8. Compound as claimed in claim 1, wherein $R^1$ is methyl, $R^2$ is 3-methyl, $R^3$ is hydrogen and $R^4$ is ethoxycarbonyl or methylhydrazinocarbonyl.

9. Compound as claimed in claim 1, wherein $R^1$, $R^2$ and $R^3$ are hydrogen, and $R^4$ is ethoxycarbonyl or hydrazinocarbonyl.

10. Compound as claimed in claim 1, wherein said compound is 1-methyl- or 1-benzyl-7-ethoxycarbonyl-1H,4H-pyrimido[2,1-c]-[1,2,4]triazin-6-one.

* * * * *

PO-1050
(5/69)

UNITED STATES PATENT OFFICE
CERTIFICATE OF CORRECTION

Patent No. 3,694,441      Dated September 26, 1972

Inventor(s) David William Dunwell and Delme Evans

It is certified that error appears in the above-identified patent and that said Letters Patent are hereby corrected as shown below:

On the front page after "Appln. No.: 121,597" insert --Foreign Application Priority Data March 11, 1970 Great Britain 11577/70--.

In column 7, line 22, "(500 g.)" should read --(500 mg.)--.

Signed and sealed this 18th day of December 1973.

(SEAL)
Attest:

EDWARD M. FLETCHER, JR.
Attesting Officer

RENE D. TEGTMEYER
Acting Commissioner of Patents